United States Patent Office 3,326,894
Patented June 20, 1967

3,326,894
METHOD OF PRODUCING WATER SOLUBLE CONDENSATION PRODUCTS AND WATER SOLUBLE CROSS LINKING CONDENSATION PRODUCTS PRODUCED BY SUCH METHOD
Heinz Enders, Stadtbergen, near Augsburg, Hans Deiner, Augsburg, Günter Pusch, Leitershofen, and Theodor Stenzinger, Augsburg, Germany, assignors to Chemische Fabrik Pfersee, G.m.b.H., Augsburg, Germany, a firm of Germany
No Drawing. Filed Mar. 18, 1964, Ser. No. 354,497
Claims priority, application Germany, Mar. 23, 1963, C 29,451
3 Claims. (Cl. 260—239)

This invention relates to methods of producing condensation products and products resulting therefrom. The invention is particularly concerned with a process of producing water soluble condensation products which crosslink under the action of heat, and to products produced by such process.

Prior art literature, such as French Patent No. 1,273,253, describes a process of reacting epoxy compounds with polyamines to produce condensation products which harden in heat through self-crosslinking, the ratio of the reacting substances being so chosen that there is 1 reactive hydrogen atom of the polyamine to 1 to 3 epoxy groups. The resulting compounds are stablized in the usual manner, namely, with volatile acids, by being adjusted to an acid pH-value.

If the mol ratio of the reactive hydrogen atom to the epoxy groups is reversed, the reaction can be carried out with fewer precautionary measures, i.e. the danger of the formation of insoluble compounds is considerably lessened. Preferably, 1.5 to 4 reactive hydrogen atoms are then used per each epoxy group; however, the amount of the polyamine can be increased up to 10 reactive hydrogen atoms.

Although epoxy compounds can be directly reacted with polyamines, it is more practical to operate in the presence of a solvent which is mixable with water.

An object of the present invention is to further develop processes and products of this type.

Other objects will become apparent in the course of the following specification.

The present invention is concerned with the discovery that all these intermediate reaction products can be reacted with low aliphatic monovalent or divalent aldehydes, particularly with formaldehyde, to produce new most valuable compounds.

This reaction takes place generally in an acid state which is that of the reaction product of epoxy compound and polyamine after the addition of acid for stabilizing purposes, preferably with a pH of about 5 to 6. However, products of aliphatic glycide ethers can be reacted with aldehyde in neutral state as well, whereby weakly acidic end products are produced.

The reaction is carried out while heating generally to about 60° C.–80° C. Usually heating for one hour is sufficient.

Aldehyde is used in the amount of 10% to 100% by weight, preferably from 30% to 50% by weight of the condensation product resulting from the compound containing epoxy groups and polyamine. In general, the amount of aldehyde is increased with an increase in the amount of amine. However, when great amounts of amine are used, there is the danger that the final products will have an undesirable dark coloring.

Formaldehyde, which is preferably used in the process of the present invention, can be used in the form of commercially available aqueous solution. However, it is also possible to use compounds which split it off, such as paraformaldehyde or unstable formaldehyde precondensates. Other aldehydes can be used as well, such as acetaldehyde, crotonaldehyde or glyoxal; however, then the products may have a dark coloring, particularly when large amounts of amine are used.

The resulting end products must be clear to opalescent liquids which can be diluted with water to any desired extent. They can be preserved and are ready to use in the acid state, but can be also neutralized. When heated above 100° C., particularly to 130° C. to 160° C., they become crosslinked by themselves or with other substances containing reactive hydrogen atoms, even without the addition of any special hardening material.

The end products of the present invention serve as gluing and sizing means for wood, cork and paper, and also for producing compressed masses from finely comminuted wood or leather.

The intermediate products resulting from a compound containing epoxy groups and polyamine, are produced while being heated, preferably in the presence of a solvent which is mixable with water, and are stabilized by the addition of volatile acids up to pH of below 7.

The compounds containing epoxy groups may be glycide ethers of polyvalent aliphatic alcohols, such as ethylene glycol, diethylene glycol, propylene glycol, butylene glycol, glycerin, 1-methyl-2,3,4-trioxypropane, or of polyphenols, such as 1,4-dioxyphenol, resorcin, 1,4-dioxy-3-methylbenzol, 3,8-dinaphthol, 4,4'-dihydroxydiphenyl methane or 4,4'-dihydroxy-diphenyl propane.

Examples of polyamines are alkylene diamines, such as ethylene diamine, propylene diamine, butylene diamine or N-ethylpropylene diamine, polyalkylene polyamines, such as diethylene triamine, triethylene tetramine, dipropylene triamine or $\omega,\omega'$-diethyl-diethylene triamine, cycloaliphatic diamines, such as 1,4-diaminocyclohexane, heterocyclic compounds with at least 2 secondary aminogroups, such as piperazine, and, finally, ethylene imine.

Acids used in the manufacture of intermediate products are volatile acids, such as hydrochloric acid, and particularly the lower carbonic acids, such as formic acid or acetic acid. They can be already present during the manufacture of the intermediate product, i.e. it is possible to carry out the reaction with salts of polyamines as well and at the end to set the acidity of the intermediate product by the addition of further amounts of acid.

The intermediate product must also consist of a clear to opalescent liquid and be capable of being diluted with water to any extent.

The following examples are given by way of illustration only:

EXAMPLE 1

200 gr. of a solution of a hereinafter described intermediate product are treated with 50 gr. of a 37% aqueous formaldehyde solution and the mixture is heated for 1 hour to 60° C. to 70° C. in a reflux condenser. After cooling a slightly yellowish opalescent solution is formed, which can be diluted with water to any desired extent.

The intermediate product is produced by heating 100 gr. of a glycide ether of 4,4-dioxydiphenyl-2.2-propane and epichlorhydrin which contain 0.43% epoxy groups, with 160 gr. methanol and 20 gr. ethylene diamine (of 85%) in a reflux condenser for about 40 minutes at 40° C. to 50° C. until milkiness appears; then 250 ml. of a 9% acetic acil are added, the mixture is heated for further 25 minutes at 65° C. to 70° C. and finally 470 ml. of a 9% acetic acid are stirred in.

EXAMPLE 2

200 gr. of glycide ether described in Example 1 are heated with 24 gr. triethylene tetramine and 150 ml. methanol for 30 minutes to 45° C. and then this intermediate product is acidified with 100 gr. of a 10% acetic acid. Thereupon 80 ml. of a 37% aqueous formaldehyde solution are added and the mixture is heated for 45 minutes to 70° C. in a reflux condenser.

Formaldehyde can be also replaced by 60 ml. of a 40% aqueous glyoxal solution but then the resulting product is somewhat more strongly colored.

EXAMPLE 3

175 gr. of a glycide ether of ethylene glycol with 0.57 epoxy groups per 100 gr., are mixed with 175 gr. methanol and 42 gr. diethylene triamine, are heated for 30 minutes to 55° C. and then the reaction is stopped with a 15% aqueous acetic acid solution by a weak acidic adjustment (pH 6).

Thereupon are added 200 gr. of a 30% aqueous formaldehyde solution adjusted to pH 7 by triethanolamine and the mixture is heated to 85° C. After one hour the product is cooled. The pH-value has dropped to 5.3 due to the reaction with formaldehyde. The product consists of a yellow liquid which can be mixed with water.

EXAMPLE 4

200 gr. of a solution of a hereinafter described intermediate product are mixed with 150 ml. of a 37% aqueous formaldehyde solution and are heated for 1 hour to 60° C.

The intermediate product is produced by heating 100 gr. of the glycide ether set forth in Example 1, 24 gr. triethylene tetramine, 10 ml. glacial acetic acid and 150 ml. isopropanol for 30 minutes to 60° C., whereupon additional 50 ml. of glacial acetic acid are added and the mixture is diluted with water to 1000 gr.

EXAMPLE 5

1000 gr. of a solution of a hereinafter described intermediate product are heated with 190 ml. of a 37% aqueous formaldehyde solution for 1 hour to 60° C.

Th formaldehyde solution can be also replaced by 140 ml. of a 40% aqueous glyoxal solution.

In both cases a liquid is formed which can be mixed with water.

The intermediate product is produced by heating 100 gr. of the glycide ether set forth in Example 1, with 43 gr. of aminoethylpiperazine and 150 ml. isopropanol during 22 minutes at 60° C., following an addition of 60 ml. glacial acetic acid and dilution with water to 1000 gr.

EXAMPLE 6

150 gr. of a glycerine glycide ether with an epoxy number of 0.7 are reacted with 45 gr. of an 85% ethylene diamine solution in the presence of 180 gr. ethanol for 10 minutes at 65° C., and are then neutralized with a 5% aqueous hydrochloric acid.

Thereupon are added 100 gr. of a neutralized 37% aqueous formaldehyde solution containing methanol and the mixture is heated for 2 hours to 70° C. The pH value of the liquid has dropped to 6.2 after this time period.

EXAMPLE 7

200 gr. of a solution of a hereinafter described intermediate product are heated along with 44 ml. of a 37% aqueous formaldehyde solution for 1 hour to 60° C.

The intermediate product is produced by heating 20 gr. of a glycide ether of dioxydiphenylpropane with 6.2 gr. of diethylenetriamine in the presence of 30 ml. dioxan for 90 minutes to 60° C., whereupon 12 ml. glacial acetic acid are added and the mixture is diluted with water to 200 gr.

EXAMPLE 8

120 gr. of an ethyleneglycolglycide ether with an epoxy number of 0.71 are diluted with 100 ml. acetone and are then heated with 50 gr. of ethylene diamine (of 85%) at 40° C. for 3 hours in a reflux codnenser, and the solution is adjusted to 5 pH with a 10% aqueous formic acid solution.

Thereupon are added 50 gr. of a 40% aqueous glyoxal solution adjusted to 5 pH with sodium carbonate, and the mixture is treated for 50 minutes at 60° C.

The resulting product is a brown-colored liquid which, however, may be mixed with water.

It is apparent that the examples described above have been given solely by way of illustration and not by way of limitation and that they are subject to many variations and modifications within the scope of the present invention. All such variations and modifications are to be included within the scope of the present invention.

What is claimed is:

1. In a process of producing water soluble condensation products by reacting a glycidic ether of a compound selected from the class consisting of polyvalent aliphatic alcohols and polyphenols, with a polyamine selected from the class consisting of alklylene diamines, polyalkylene polyamines, cycloaliphatic diamines, heterocyclic diamines and ethylene imine while heating to a temperature of at most 90° C. to produce a water soluble intermediate product and adding a volatile acid selected from the class consisting of hydrochloric acid and water soluble aliphatic carbonic acids to stabilize said intermediate product up to a pH of below 7, the improvement which comprises reacting the intermediate product with an aldehyde selected from the class consisting of formaldehyde and paraformaldehyde, glyoxal while heating to a temperature ranging between 55° C. and 85° C.

2. A water soluble cross linking condensation product resulting from the reaction of a water soluble, neutralized intermediate product produced from the reaction of a glycidic ether of a compound selected from the class consisting of polyvalent aliphatic alcohols and polyphenols, with a polyamine selected from the class consisting of alkylene diamines, polyalkylene polyamines, cycloaliphatic diamines, heterocyclic diamines and ethylene imine followed by the addition of a volatile acid, with an aldehyde selected from the class consisting of formaldehyde and paraformaldehyde, glyoxal while heating to a temperature ranging between 55° C. and 85° C.

3. The process in accordance with claim 1, wherein the reaction of said compound with said polyamine takes place in the presence of a water-soluble solvent.

References Cited

UNITED STATES PATENTS

| | | | |
|---|---|---|---|
| 2,541,260 | 2/1951 | Malkemus | 260—268 |
| 2,817,675 | 12/1957 | Hofer et al. | 260—584 |
| 2,901,461 | 8/1959 | Auerbach et al. | 260—584 |
| 3,025,313 | 3/1962 | Gunderson | 260—584 |
| 3,122,550 | 2/1964 | Heusser | 260—568 |
| 3,148,199 | 9/1964 | De Groote et al. | 260—584 |
| 3,200,155 | 8/1965 | Kirkpatrick | 260—584 |

FOREIGN PATENTS 1,273,253  10/1961  France.

ALEX MAZEL, Primary Examiner.

HENRY R. JILES, Examiner.

JAMES W. ADAMS, JR., Assistant Examiner.